United States Patent
Prakash et al.

(10) Patent No.: US 10,907,086 B2
(45) Date of Patent: Feb. 2, 2021

(54) HIGH TEMPERATURE GRAVEL PACKING FLUID SYSTEM

(71) Applicant: Halliburton Energy Services, Inc., Houston, TX (US)

(72) Inventors: Chetan Prakash, Pune (IN); Sairam Eluru, Pune (IN); Monalisa Mallick, Kolkata (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/345,548

(22) PCT Filed: Nov. 29, 2016

(86) PCT No.: PCT/US2016/064027
§ 371 (c)(1),
(2) Date: Apr. 26, 2019

(87) PCT Pub. No.: WO2018/101917
PCT Pub. Date: Jun. 7, 2018

(65) Prior Publication Data
US 2019/0316024 A1    Oct. 17, 2019

(51) Int. Cl.
| E21B 43/04 | (2006.01) |
| C09K 8/514 | (2006.01) |
| C09K 8/68  | (2006.01) |
| C09K 8/80  | (2006.01) |
| E21B 43/267 | (2006.01) |

(52) U.S. Cl.
CPC ............ *C09K 8/514* (2013.01); *C09K 8/68* (2013.01); *C09K 8/80* (2013.01); *E21B 43/04* (2013.01); *E21B 43/267* (2013.01); *C09K 2208/08* (2013.01)

(58) Field of Classification Search
None
See application file for complete search history.

(56) References Cited

U.S. PATENT DOCUMENTS 8,322,419 B2 * 12/2012 Parlar .................. E21B 43/04
                                                166/278
8,546,318 B2   10/2013 D'Ambrogio et al.
(Continued)

FOREIGN PATENT DOCUMENTS

EP    2307100      2/2016
WO    2009047480   4/2009
(Continued)

OTHER PUBLICATIONS

Halliburton, AquaLinear HT High Temperature Gravel Pack Fluid Service, A Viscosified Fluid System Used for Gelling Water-Based Completion and Treating Fluids, H06780, Dec. 2012.
(Continued)

*Primary Examiner* — Andrew Sue-Ako
(74) *Attorney, Agent, or Firm* — Thomas Rooney; C. Tumey Law Group PLLC

(57) ABSTRACT

A composition and method for treating a subterranean formation that includes preparing a treatment gel of aqueous fluid, a thickening agent soluble in the aqueous fluid, sand/gravel, and micro fibrous cellulose. Placing the treatment gel in at least a portion of a subterranean formation.

16 Claims, 5 Drawing Sheets

| At 310°F | | At 325°F | |
|---|---|---|---|
| Without MFC | With 50 lb/Mgal MFC | Without MFC | With 100 lb/Mgal MFC |
| 30% in 2 Hours | 0% in 2 Hours | 100% in 30 Minutes | 10% in 30 Minutes |

(56) References Cited

U.S. PATENT DOCUMENTS

| | | |
|---|---|---|
| 2004/0141934 A1* | 7/2004 | Fei .................. A61Q 15/00 424/65 |
| 2005/0261138 A1 | 11/2005 | Robb et al. |
| 2006/0078682 A1 | 4/2006 | McDaniel et al. |
| 2013/0274149 A1 | 10/2013 | Lafitte et al. |
| 2015/0368541 A1 | 12/2015 | Monclin et al. |

FOREIGN PATENT DOCUMENTS

| | | |
|---|---|---|
| WO | 2016060120 | 4/2016 |
| WO | 2016153702 | 9/2016 |
| WO | 2017131704 | 8/2017 |

OTHER PUBLICATIONS

ISRWO International Search Report and Written Opinion for PCT/US2016/064027 dated Aug. 28, 2017.

Journal of Applied Polymer Science vol. 125, Issue 4, pp. 2882-2889, Aug. 15, 2012, Thermal and Mechanical Properties of Polypropylene Nanocomposite Materials Reinforced with Cellulose Nano Whiskers.

Journal of Applied Polymer Science vol. 114, Issue 5, pp. 2723-2730, Dec. 1, 2009, The effect of plasticizer and cellulose nanowhisker content on the dispersion and properties of cellulose acetate butyrate nanocomposites.

\* cited by examiner

| At 310°F | | At 325°F | |
|---|---|---|---|
| Without MFC | With 50 lb/Mgal MFC | Without MFC | With 100 lb/Mgal MFC |
| 30% in 2 Hours | 0% in 2 Hours | 100% in 30 Minutes | 10% in 30 Minutes |
|  |  |  |  |

| Test 1 | Test 2 | |
|---|---|---|
| Without MFC | With MFC | |
| At 305°F | At 330°F | At 340°F |
| 3-4% Settling in 1 Hour | 0 % Settling in 1 Hour | 0% Settling in 1 Hour |
|  |  |  |

HIGH TEMPERATURE GRAVEL PACKING FLUID SYSTEM

CROSS-REFERENCE TO RELATED APPLICATIONS

None.

FIELD

The present disclosure relates to completion and remedial well operations in oil and gas wells. More particularly, the present disclosure relates to methods of wellbore completions in hydrocarbon bearing subterranean formations. More particularly, the present disclosure relates to viscosified treatment fluids and their use in oil field operations.

BACKGROUND

In oil field operations, viscosified treatment fluids are often used to carry particulates into subterranean formations for various purposed, e.g., to deliver particulates to a desired location within a wellbore. Examples of subterranean operations that use such viscosified treatment fluids include servicing and completion operations such as fracturing and gravel packing.

A widely used stimulation technique is hydraulic fracturing, in which a viscosified fracturing fluid is injected through a well into the surrounding formation at a sufficient pressure to fracture the formation adjacent to the well. Often a high-viscosity fracturing fluid containing proppant is used for the fracturing operation. The fracture is initiated and continues to grow as more fluid and proppant are introduced into the formation. A reduction in pressure along with fluid leak-off from the created fracture into permeable areas of the formation allows the fracture to close on the proppant. The proppant holds the fracture open and provides a highly conductive pathway for flow of hydrocarbons and/or other formation fluids, thus increasing the rate at which fluids can be produced by the formation.

In sand control operations an operation known as gravel packing can be performed. In gravel pack operations, a screen, slotted liner, or other mechanical device is placed into a portion of the wellbore. A viscosified gravel pack fluid is used to deposit particulates referred to as gravel into the annulus between the mechanical device and the formation or casing to inhibit the flow of particulates from a portion of the subterranean formation to the wellbore.

As used herein the terms gravel and sand can be used interchangeably. The sand used for a gravel pack operation can be of a larger size than the sand used for a fracturing operation, but does not have to be.

A frac pack system combines elements of a fracturing operation with a gravel pack operation and enables the procedures to be performed in a single trip in the well. This completion method is particularly effective in certain formations such as ones containing unconsolidated sand and high permeability formations. Typically, a high-viscosity fluid is used for the frac pack operation.

In most instances, a viscosified treatment fluid should maintain its viscosity in a subterranean operation until that operation is completed, after which the fluid may be "broken" (i.e., its viscosity may be reduced), e.g., so as to deposit particulates from the fluid into a desired location within the subterranean formation and/or to reclaim it from the suberranean formation.

The treatment fluids used in subterranean operations are predominantly water-based liquids comprising polymeric gelling agents that may increase their viscosities, inter alia, to enhance the treatment fluids' sand suspension capabilities. These gelling agents are usually biopolymers or synthetic polymers that, when hydrated and at a sufficient concentration, are capable of forming a viscous solution. Common gelling agents include polysaccharides such as galactomannan gums, cellulosic polymers, and xanthan.

Polysaccharide based gels are commonly used to increase the viscosity of fluids. Polysaccharide based gels can be obtained from many sources, these can include plant, synthetic, bio organisms, and others. Guar gum based gels are commonly used. The seeds of the guar bean contain a large endosperm that consists of a very large polysaccharide of galactose and mannose. This polymer is water-soluble and exhibits a viscosifying effect in water. Guar gum is used in many different applications to modify viscosity in food products and in industrial uses.

Fracturing fluids having stable proppant carrying capabilities are needed for proppant suspension and transport and to create the desired fracture geometry. It may not be possible to obtain the desired high proppant carrying capabilities by simply increasing the concentration of the gelling agent. Biopolymer based fracturing fluids can be limited by other disadvantages such as hydration limitations of the polymer, potential formation damage from undesirable coating of formation surfaces with the polymer or residue, and instability of the polymer at elevated temperatures in certain types of fracturing applications. Biopolymer-based fracturing fluids such as guar-based fracturing fluids can be particularly limited by the instability of the polymer at elevated temperatures where the polymer can break down prematurely and undermine a fracturing or gravel pack operation.

Certain unconventional reservoirs such as hydrocarbon containing shale deposits, high temperature—high pressure formations, geothermal formations and other reservoirs that have properties other than the typical conventional reservoir may be particularly suited to the compositions and methods of the present disclosure. Horizontal wells can be particulary challenging to keep sand in suspension due to the length of horizontal section that the fluid carrying the sand has to travel. The effect of gravity on the fluid while it is traveling through a non-vertical section of wellbore encourages sand settling. Wells having extended horizontal sections can be subject to sand settling within the wellbore prior to reaching the formation zone to be gravel packed, which can lead to ineffective completions and increased costs. A gravel pack fluid having increased viscosity, stability and transport properties can be needed on such unconventional wells.

For higher viscosity fracturing fluids, gel compositions that include a cross-linkable polymer soluble in an aqueous fluid can be used. These gel compositions can be thermally resistant; they do not break down easily upon exposure of elevated temperature from the formation, which can be beneficial when treating high temperature formations. These crosslinked fluids can be used for open hole gravel packing, fracturing and frac pack application but can be problematic when close tolerances are observed such as when gravel packing when using shunt tubes. Generally cross linked polymer fluids are not desirable for gravel pack operations because gravel packing operations generally involve the need to flow the gravel pack fluid through shunt tubes which have a small diameter that will result in a large pressure drop.

A major problem in gravel packing, especially where long or inclined intervals are to be completed, lies in adequately distributing the gravel over the entire completion interval, i.e. completely packing the well annulus along the length of the screen. Poor distribution of gravel is often caused when liquid from the gravel slurry is lost prematurely into the more permeable portions of the formation thereby causing "sand bridges" to form in the annulus before all of the gravel has been placed. These sand bridges effectively block further flow of the slurry through the annulus thereby preventing delivery of gravel to all parts of the annulus surrounding the screen.

To alleviate this problem, shunt tubes or by-pass conduits can extend along the length of the tool which receive gravel slurry as it enters the well annulus. Slurry can pass through the shunt tubes to be delivered to different levels in the annulus above and/or below the sand bridge. The shunt tube provides an alternate path for the gravel pack fluid, although through a more restricted path that can result in an increased pressure drop across the tool.

Sand suspension is a critical requirement for fluid in gravel packing operations, especially during completion of horizontal wells. Sand suspension of a gel is dependent on polymer stability and gel elasticity, which in turn depends on the temperature, gelling agent concentration, presence of dissolved or entrained oxygen, and sometimes on brine type and density. An important parameter in gravel packing completions is the gel used for the transport of the sand should have linear characteristics and should not be crosslinked due to the pressure drop that will result from flow through shunt tubes.

Wells are being drilled to greater depths and are encountering high pressure and high temperature HP/HT conditions. Many HT/HP reservoir characteristics are such that completion success rates are higher when completed with gravel packing. Linear diutan gels have good thermal stability up to 270° F., but above this the gel stability decreases with an adverse effect on sand suspension abilities. Certain gel stabilizers such as sodium erythorbate, sodium ascorbate, ascorbic acid, erythorbic acid, sodium erythorbate and others can improve thermal stability of diutan gel up to 310° F. However when diutan or hydroxypropyl starch phosphate (HPSP) gel is exposed at temperatures above 310° F. their sand suspension properties decrease drastically. Therefore, gravel packing in hotter extended horizontal wells is still a challenge.

Thus, there is a need for improved methods of treating subterranean formations such as fracturing, gravel packing and frac pack treatments. There is a need for thermally stable gel compositions for increased sand/gravel suspension and transport.

BRIEF DESCRIPTION OF DRAWINGS

The accompanying views of the drawing are incorporated into and form a part of the specification to illustrate aspects and examples of the present disclosure. The figures are only for the purpose of illustrating examples of how the various aspects of the disclosure can be made and used and are not to be construed as limiting the disclosure to only the illustrated and described examples.

DETAILED DESCRIPTION

Figure 1:
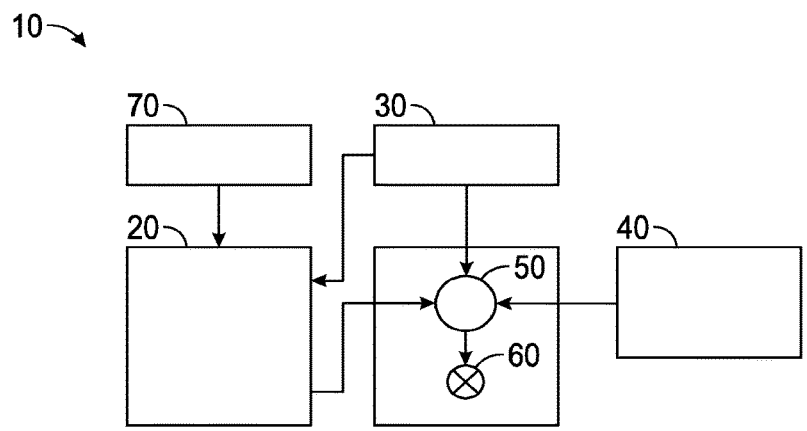
FIG. 1 is a diagram illustrating an example of a fracturing system that may be used in accordance with certain embodiments of the present disclosure.

The present disclosure provides a composition useful for fracturing and gravel packing a subterranean formation penetrated by a wellbore. The composition includes a thermally resistant gel containing micro fibrous cellulose (MCF). The present disclosure further provides a method of fracturing a subterranean formation penetrated by a wellbore. The present disclosure further provides a method of gravel packing a subterranean formation penetrated by a wellbore. The present disclosure further provides a method of performing a frac pack operation in a subterranean formation penetrated by a wellbore. The methods can be particularly effective in high temperature formations and in extended horizontal wells.

Certain unconventional reservoirs such as extended reach non-vertical wells, high temperature formations, and geothermal formations may be particularly suited to the compositions and methods of the present disclosure. Wells needing extended proppant and/or sand transport, such as wells having long horizontal sections that require increased elastic modulus and stability to reduce proppant/sand settling may be particularly suited to the compositions and methods of the present disclosure.

The treatment fluids disclosed herein may be linear gels the include an aqueous base fluid, a gelling agent, and a prepared gravel of a specific size. Linear gels provide superior gravel packing as compared to crosslinked gels, and may not incur the pumping problems that can affect crosslinked gels, or other highly viscous fluids pumped at low pressure with low shear rates. Further, linear gels may be used with shunt tubes, without limitation, due to shunt tubes having reduced dimensions that incur higher pressure drop when pumping crosslinked gels or highly viscous fluids. Gravel packing operations are typically performed at low shear rates with a low pressure (e.g., below fracture pressure), and in such conditions, linear gels are able to sufficiently suspend gravel at the desired capacity. Also linear gels may perform better in horizontal wells for the suspension of gravel and may be easier to pump to a desired location in such operations.

The treatment fluids disclosed herein may include an aqueous base fluid. The aqueous base fluid may be from any source. In various examples, the aqueous base fluid may comprise fresh water, acidified water, salt water, seawater, brine, or an aquous salt solution. In embodiments, the base fluid can comprise fresh water. One of ordinary skill in the art will recognize that fresh water can be obtained from any available source including treated water sources (e.g., drinking water, reclaimed wastewater or desalinated water) or untreated water sources (e.g., streams, lakes or rivers). One of ordinary skill in the art will further recognize that fresh water sources can contain minor amounts of salts, biological materials and other substances that do not substantially affect its use as a base fluid in the present embodiments.

In some embodiments, the base fluid comprises an aqueous salt solution. Such aqueous salt solutions can have a salt concentration ranging between about 0.1% and about 10% by weight. The salt concentration can range between about 1% and about 10% by weight in some embodiments or between about 2% and about 5% by weight in other embodiments. In some embodiments the aqueous salt solution can be 2% KCl. Salts may be added to the water source, inter alia, to provide a brine to produce a treatment fluid having a desired density or other characteristics. One of ordinary skill in the art with the benefit of this disclosure will recognize the particular type of salt appropriate for a particular application, given considerations such as protection of the formation, the presence or absence of reactive clays in the formation adjacent to the well bore, and the factors affecting wellhead control. A wide variety of salts may be suitable. Examples of suitable salts include, inter alia, potassium chloride, sodium bromide, ammonium chloride, cesium formate, potassium formate, sodium formate, sodium nitrate, calcium bromide, zinc bromide, and sodium chloride. An artisan of ordinary skill with the benefit of this disclosure will recognize the appropriate concentration of a particular salt to achieve a desired density given factors such as the environmental regulations that may pertain. Also, the composition of the water used also will dictate whether and what type of salt is appropriate.

In examples the aqueous base fluid can include a monovalent brine or a divalent brine. Suitable monovalent brines may include, for example, sodium chloride brines, sodium bromide brines, potassium chloride brines, potassium bromide brines, and the like. Suitable divalent brines cmay include, for example, magnesium chloride brines, calcium chloride brines, calcium bromide brines, and the like. In alternate embodiments the aqueous1base fluid may be a high density brine. As used herein, the term "high density brine" refers to a brine that has a density of about 8.33 lbs/gal to about 19.2 lb/gal or greater.

Treatment fluids used herein may include a linear gelling agent. Treatment fluids used herein may include a polysaccharide gelling agent. Suitable polysaccharide gelling agents may include xanthan, scleroglucan, diutan, succinoglycan, guar, hydroxyethylcellulose, and modifications, derivatives, and combinations thereof. The polysaccharide gelling agent may be present in the gravel packing fluids in an amount in the range of from about 10 lb/1,000 gal to about 300 lb/1,000 gal, alternately about 25 lb/1,000 gal to about 100 lb/1,000 gal, or about 50 lb/1,000 gal, 75 lb/1,000 gal, 150 lb/1,000 gal, 200 lb/1,000 gal, or 250 lb/1,000 gal. With the benefit of this disclosure one of ordinary skill in the art should be able to determine a type and amount of polysaccharide gelling agent for use in a desired application.

The gravel packing fluids may comprise a gravel. As used herein, "gravel" may be any particulate manner used to filter sand or other similar particulate solids from the production fluid or other such produced fluids. Examples of gravel may include, sand, ceramics, andy type of proppant, or any type of sized solid particulate. The gravel may be pre-sized to a specific desirable size. If a screen is used, the gravel may be sized at a size greater than the screen apertures. The gravel may have a size in the range of about 0.0083 inch to about 0.0661 inch. Alternately, the gravel may have a size of 12/18, 16/30, 20/40, 30/50, or 40/70 US mesh. The gravel may be included in the gravel packing fluids in an amount of in a range of about 0.5 pounds added per gallon to about 10 pounds added per gallon, alternatively about 1 pound added per gallon to about 7 pounds added per gallon, alternatively about 2 pounds added per gallon to about 4 pounds added per gallon, or about 6 pounds added per gallon, 7 pounds added per gallon, or 8 pounds added per gallon. The gravel may be carried to a subterranean formation location wherein filteration (e.g., sand control) is needed via the gravel packing fluid and placed in said location. If the gravel packing fluids do not possess a sufficient viscosity and/or break prematurely, the gravle may settle out of the gravel packing fluids and a gravel pack may not be formed. With the benefit of this disclosure one of ordinary skill in the art should be able to determine a type, amount, and size of gravel for use in a desired application.

Embodiments of the present disclosure include gravel packing fluids that may be used in a subterranean formation having a bottom hole static temperature of up to about 350° F. and above. For example, the gravel packing fluids may be used in a subterranean formation having a bottom hole static temperature of up to about 325° F.

Alternatively, the gravel packing fluids may be used in a subterranean formation having a bottom hole static temperature of up to about 300° F.

Alternatively, the gravel packing fluids may be used in a subterranean formation having a bottom hole static temperature of up to about 275° F. By way of example, the gravel packing fluids may be used in subterranean formations having a bottom hole static temperature of from about 275° F. to about 350° F. With the benefit of this disclosure one of ordinary skill in the art should be able to produce a gravel packing fluid for use in a subterranean formation with a bottom hole static temperature up to about 350° F.

Those of ordinary skill in the art will appreciate that the gravel packing fluids generally should have a density suitable for a particular application. By way of example, the gravel packing fluids may have a density in the range of from about 8 pounds per gallon ("lb/gal") to about 20 lb/gal. In certain examples, the gravel packing fluids may have a density in the range of from about 10 lb/gal to about 17 lb/gal. Those of ordinary skill in the art, with the benefit of this disclosure, will recognize the appropriate density for a particular application.

Disclosed herein is a method for use in treating subterranean formations. In certain illustrative embodiments, a gel composition is used comprising an aqueous fluid, a thickening agent that is soluble in the aqueous fluid, and micro fibrous cellulose. The gel composition can be injected into the subterranean formation and allowed to penetrate the formation. The gel composition can be used in fracturing operations to create fractures and increase connectivity between existing pores and natural channels in the formation. The gel composition can be used in gravel pack operations to deliver sand to an area between a gravel pack screen and the the formation. The gel composition can optionally be used in frac pack operations to both fracture and gravel pack a well or portion of a well.

Cellulose ($C_6H_{10}O_5$) is a common organic polymer and is generally considered an environmentally friendly product. Cellulose has desirable properties such as renewability, biodegradability, nontoxicity, high specific strength and stiffness, good thermal stability, and high UD (length/diameter) ratio. Cellulose based biopolymers such as cellulose acetate (CA), cellulose acetate butyrate (CAB), and cellulose acetate propionate (CAP) are examples that have been used in various commercial engineering applications. Cellulose has been used as a reinforcement material in polymers for many years. The present disclosure is not limited by the type of cellulose used, any efficacious form of cellulose can be utilized. As used herein the term micro fibrous cellulose (MFC) can be any form of cellulose that is effective in providing improved properties as disclosed herein.

In recent years two different kinds of cellulose structures have been used on a nanoscale, namely microfibrils and nanowhiskers. Cellulose is found in plants in the form of microfibrils, which form the structurally strong framework in cell walls. Microfibrils are bundles of cellulose molecules that are elongated and are stabilized laterally by hydrogen bonds. A single microfibril contains multiple elementary fibrils constituting many cellulose chains. The elementary fibrils can have a diameter of approximately 2-20 nm, depending on the source. The elementary fibrils are composed of amorphous and crystalline regions. With the removal of the amorphous region by performing acid hydrolysis, crystalline cellulose entities called cellulose nanowhiskers can be obtained. Cellulose nanowhiskers can be made from sources such as tunicates, wood, and wheat straw. Cellulose microfibrils and nanowhiskers can be used in the present disclosure, as can other physical forms of cellulose that can have a structurally and thermally enhancing effect on the materials they are mixed with.

Figure 4:
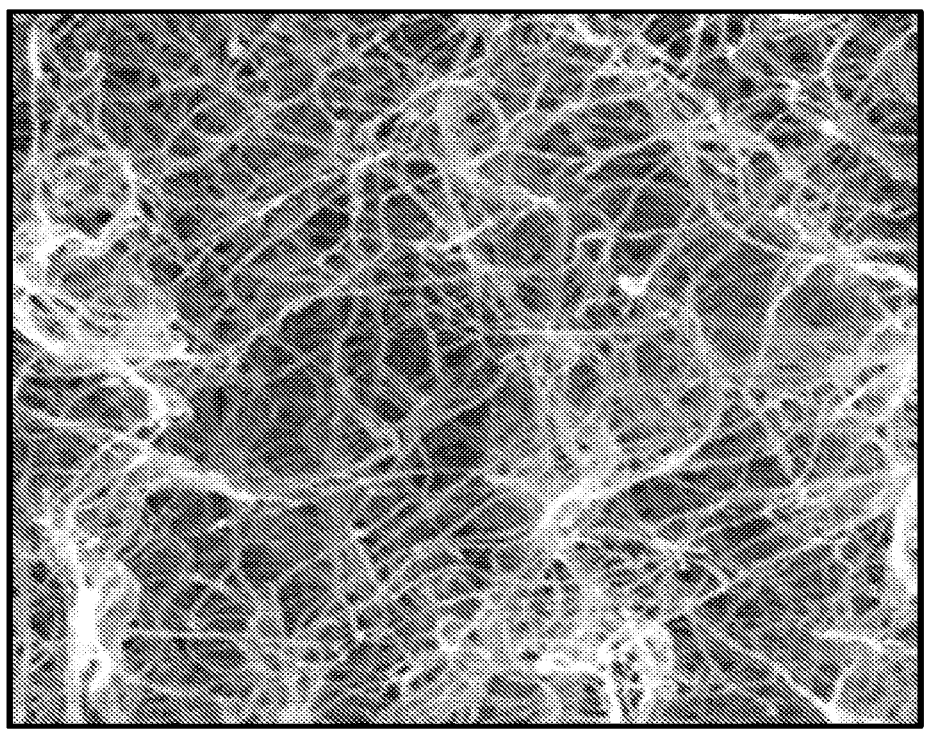
FIG. 4 is a photograph showing a three dimensional network formed by micro fibrous cellulose.

Micro fibrous cellulose (MFC) has been found to increase the thermal stability of diutan and hydroxyl propyl starch phosphate fluids. The addition of MFC in a diutan or hydroxyl propyl starch phosphate gel has significantly improved the thermal stability and the sand suspending properties of the gel. The micro fibrous nature of MFC material forms a three dimensional network as shown in FIG. 4. The duitan molecules or starch molecules become surrounded by this network structure which leads to improved sand suspension properties. One source of MFC is under the brand name CELLULON® PX commercially available by CP Kelco of Atlanta, Ga.

In an embodiment the micro fibrous cellulose is present in the treatment fluid in an amount of about 5 lb/1,000 gal to about 300 lb/1,000 gal. Alternatively about 10 lb/1,000 gal to about 250 lb/1,000 gal, alternatively about 25 lb/1,000 gal to about 100 lb/1,000 gal, or about 150 lb/1,000 gal, 200 lb/1,000 gal, or 250 lb/1,000 gal.

The exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary fracturing or gravel packing system 10, according to one or more embodiments. In certain instances, the system 10 includes a treatment fluid producing apparatus 20, a fluid source 30, a proppant or sand source 40, and a pump and blender system 50 and resides at the surface at a well site where a well 60 is located. In certain instances, the treatment fluid producing apparatus 20 combines a gel pre-cursor with fluid (e.g., liquid or substantially liquid) from fluid source 30, to produce a hydrated gelled fluid that is used to fracture the formation or gravel pack a portion of the well. The hydrated gelled fluid can be a fluid for ready use in treatment of the well 60 or a concentrate to which additional fluid is added prior to use in treatment of the well 60. In other instances, the treatment fluid producing apparatus 20 can be omitted and the gelled fluid sourced directly from the fluid source 30. In certain instances, the treatment fluid may comprise water, a hydrocarbon fluid, a polymer gel, foam, air, wet gases and/or other fluids.

The sand source 40 can include a proppant for combination with a fracturing fluid or a sand for use in a gravel pack operation. The system may also include additive source 70 that provides one or more additives (e.g., gelling agents, weighting agents, and/or other optional additives) to alter the properties of the treatment fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the treatment fluid and combines it with other components, including sand from the sand source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the treatment fluid producing apparatus 20, fluid source 30, and/or proppant source 40 may be equipped with one or more metering devices (not shown) to control the flow of fluids, sand, and/or other compositions to the pumping and blender system 50. Such metering devices may permit the pumping and blender system 50 can source from one, some or all of the different sources at a given time, and may facilitate the preparation of treatment fluids in accordance with the present disclosure using continuous mixing or "on-the-fly" methods. Thus, for example, the pumping and blender system 50 can provide just treatment fluid into the well at some times, just sand at other times, and combinations of those components at yet other times.

Figure 2:
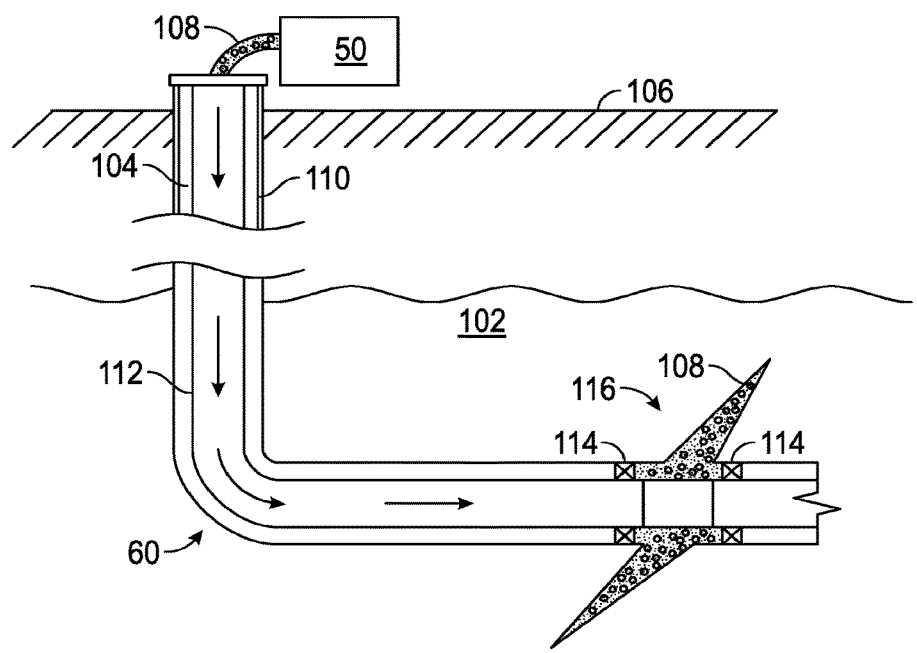
FIG. 2 is a diagram illustrating an example of a subterranean formation in which a fracturing operation may be performed in accordance with certain embodiments of the present disclosure.

FIG. 2 shows a well 60 during a fracturing operation in a portion of a subterranean formation of interest 102 surrounding a well bore 104. The well bore 104 extends from the surface 106, and a fracturing fluid 108 is applied to a portion of the subterranean formation 102 surrounding the horizontal portion of the well bore. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro-jetting and/or other tools.

The well is shown with a work string 112 descending from the surface 106 into the well bore 104. The pump and blender system 50 is coupled to a work string 112 to pump the fracturing fluid 108 into the well bore 104. The working string 112 may include coiled tubing, jointed pipe, and/or other structures that allow fluid to flow into the well bore 104.

The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

Figure 3:
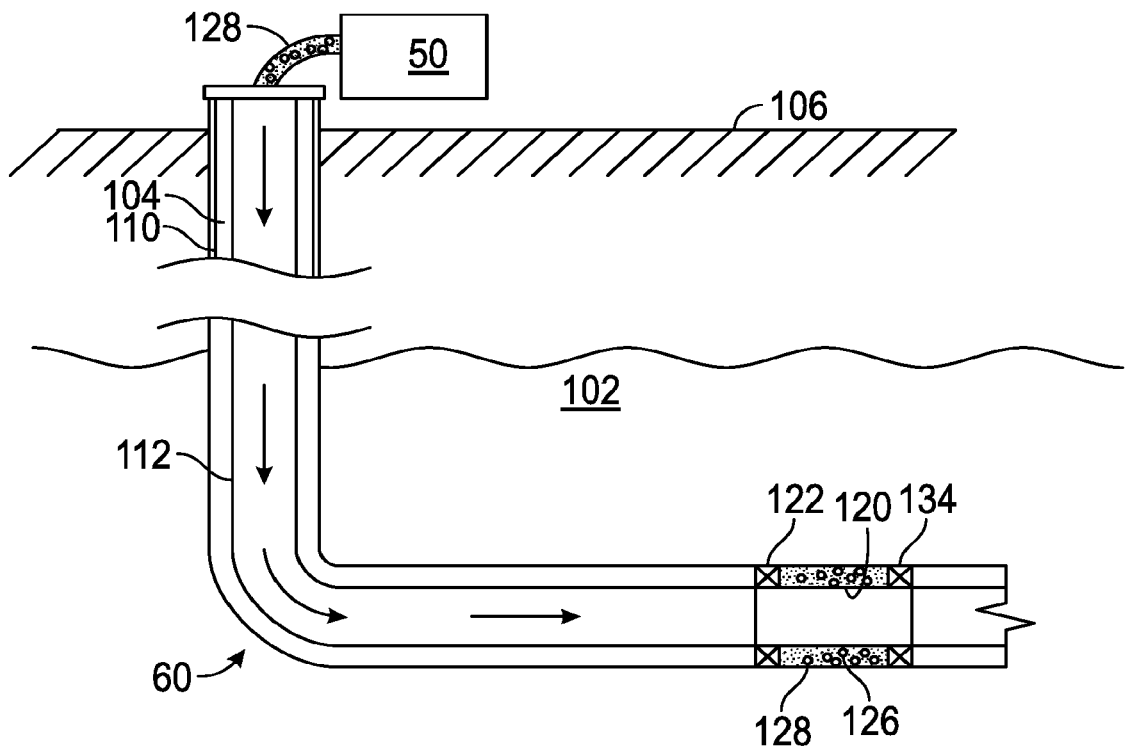
FIG. 3 is a diagram illustrating an example of a subterranean formation in which a gravel pack operation may be performed in accordance with certain embodiments of the present disclosure.

FIG. 3 shows a well 60 during a gravel pack operation adjacent a portion of a subterranean formation of interest 102 surrounding a well bore 104. The well bore 104 extends from the surface 106. Although shown as vertical deviating to horizontal, the well bore 104 may include horizontal, vertical, slant, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. In cased wells, perforations can be formed using shape charges, a perforating gun, hydro-jetting and/or other tools.

The well is shown with a work string 112 descending from the surface 106 into the well bore 104. A gravel pack screen 120 is located on the distal end of the working string 112 and is shown with an upper packer 122 and a lower packer 124 which define an annulus area 126 between the gravel pack screen 120 and the casing 110. The pump and blender system 50 is coupled to the work string 112 to pump a gravel pack fluid 128 through the working string 112. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the annulus area 126 between the gravel pack screen 120 and the casing 110. For example, the working string 112 may include ports to communicate the gravel pack fluid 128 into an annulus area 126 between the gravel pack screen 120 and the casing 110.

In an illustrative embodiment, the gel composition has an aqueous fluid and a thickening agent that is soluble in the aqueous fluid. The present disclosure is not limited by the type of thickening agent used in a gel composition. In an illustrative embodiment, the thickening agent is a diutan based gel. In an illustrative embodiment, the thickening agent is a guar based gel. In an illustrative embodiment, the thickening agent is a hydroxyl propyl starch phosphate (HPSP) based gel. In illustrative embodiments, the thickening agent can be a polymer based agent or a non-polymer based agent or combinations thereof. Non-polymer based thickening agents can include surfactant fluid systems, viscoelastic surfactant (VES) fluid systems, VES foams, hydrocarbon based systems, liquid $CO_2$ based systems, $CO_2/N_2$ based systems, unconventional $CO_2$ foam based systems, and others.

In an illustrative embodiment, the gel composition contains micro fibrous cellulose (MFC). The present disclosure is not limited by the type of MFC used in a gel composition.

To facilitate a better understanding of the presently disclosed subject matter, the following examples are given. In no way should the following examples be read to limit, or define, the scope of the presently disclosed subject matter.

EXAMPLE 1

Duitan Based Gel

Three duitan based fluid gels with differing MFC content were made having the formulations as shown in Table 1. These gels were each heated to 310° F. and the rheology tested for 180 minutes.

TABLE 1

Formulation of Diutan Fluid

| Mixing Order | Additive | Function | Chemical Detail | Concentration |
|---|---|---|---|---|
| 1 | 9.2 ppg NaBr brine | Brine | Sodium Bromide | Base Fluid |
| 2 | Aldacide G | Biocide | Glutaraldehyde | 0.12 gal/1,000 gal |
| 3 | WG-38 | Gelling Agent | Diutan | 80 lb/1,000 gal |
| 4 | FDP-S714-04 | Iron Control | Sodium Citrate | 12 lb/1,000 gal |
| 5 | FDP-S1081-13 | Gel Stabilizer | Sodium Erythorbate | 40 lb/1,000 gal |
| 6 | MFC Material | Stability Modifier | Cellulose | 0/50/100 lb/1,000 gal |

Figure 5:
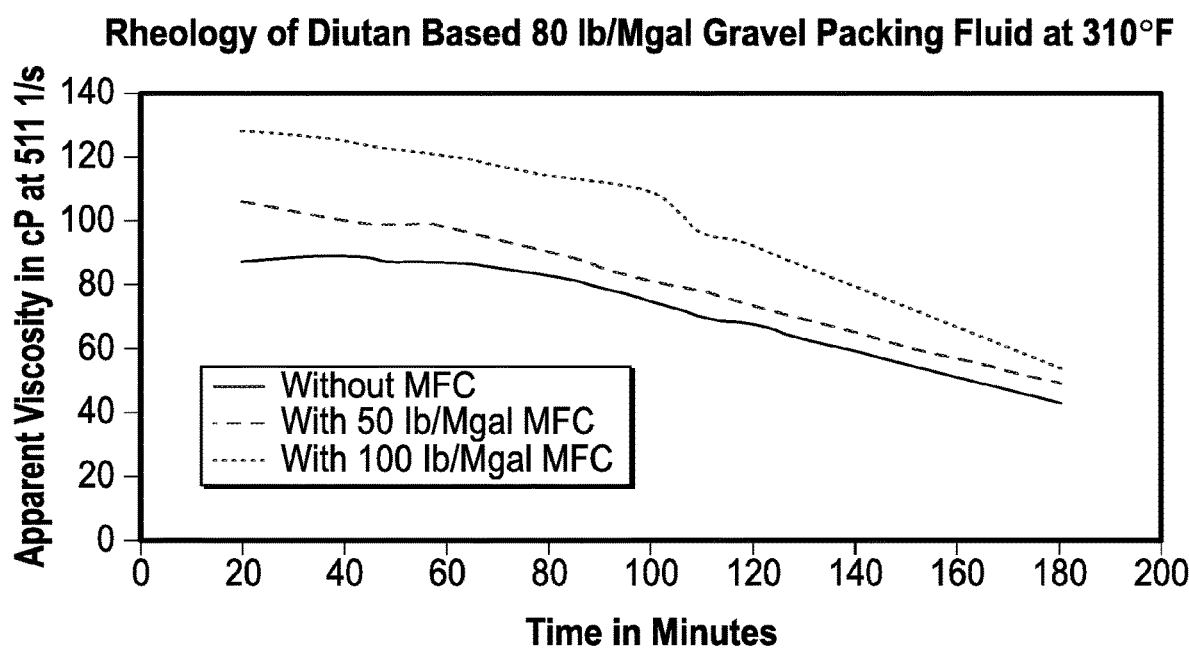
FIG. 5 is a graph of viscosity vs time for gravel pack fluid with different micro fibrous cellulose content.

Fluid rheology was tested on a Chandler 5550 HPHT viscometer using a B1X bob under nitrogen pressure. The rheology data of the diutan gel at 310° F. with and without the addition of MFC are presented in Table 2. The resulting data plots are shown in FIG. 5. Viscosity increases with the addition of MFC and remains elevated above the base fluid without MFC throughout the entire test.

TABLE 2

| Elapsed time (minutes) | Without MFC | With 50 lb/1,000 gal MFC | With 100 lb/1,000 gal MFC |
|---|---|---|---|
| 20 | 87 | 106 | 128 |
| 40 | 89 | 100 | 125 |
| 50 | 87 | 99 | 122 |

TABLE 2-continued

| Elapsed time (minutes) | Without MFC | With 50 lb/1,000 gal MFC | With 100 lb/ 1,000 gal MFC |
|---|---|---|---|
| 60 | 87 | 98 | 120 |
| 80 | 83 | 90 | 114 |
| 100 | 75 | 81 | 109 |
| 110 | 70 | 78 | 96 |
| 120 | 67 | 73 | 92 |
| 180 | 43 | 49 | 54 |

Sand Settling

Figure 6:
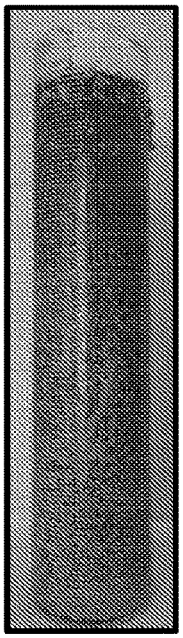
FIG. 6 is a set of photographs showing sand settling results from tests of compositions with and without micro fibrous cellulose content.
Figure 6:
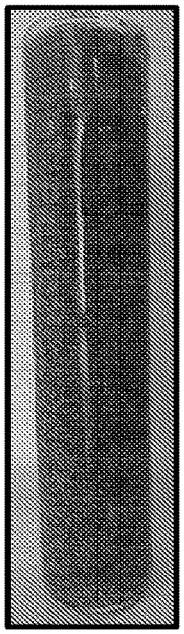
Figure 6:
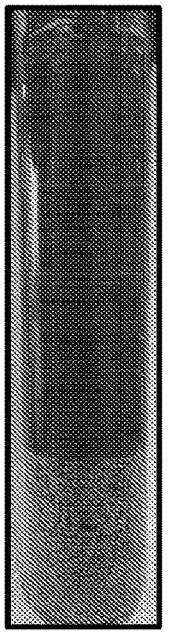
Figure 6:
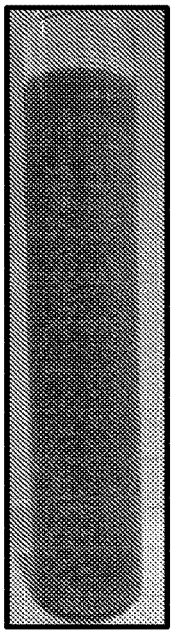

A series of sand settling tests were performed in an autoclave under nitrogen pressure. A concentration of 80 lb/1,000 gal WG-38 and 4 ppa 20/40 Carbolite proppant was used. The results show that as the stability of diutan based gravel packing gel at 310° F. was increased in presence of MFC material and the sand settling rate decreased. At 310° F. the sample without MFC had a settling of 30% within two hours, whereas the sample containing MFC had no settling in the same two hours. Samples of the same composition were tested at 325° F., the sample without MFC had a settling of 100% within thirty minutes, whereas the sample containing MFC had only 10% settling in the same thirty minutes. These test results demonstrate that in presence of MFC material the treatment gel becomes more stable and allows the sand/proppant to remain suspended in the gel for an extended time at elevated temperatures. A similar effect is expected for other gravel packing fluids and for fluids prepared using other brines than the ones tested herein. The results are shown in FIG. 6 which are photographs of the sand settling tests.

Regain Permeability

A regain permeability test was conducted on an aloxite core sample at 310° F. The fluid was prepared by following the recipe as listed in Table 1. The MFC was added at 100 lb/1,000 gal concentration and AQLB-2 breaker was mixed at 0.5 gal/1,000 gal concentration. AQLB-2 is a breaker commercially available by Halliburton that is an acetic acid and actic acid anhydrate mixture. Permeability measurements both before and after the treatment were conducted by flowing 2% KCl brine at 2 ml/min from the production direction. The initial permeability of the core was 229.13 md. After pumping the 10 pore volumes of fluid from the injection direction the core was allowed to stand for 8 hours at 310° F. to break the filter cake. After treatment the permeability of the core sample was reduced to 188.78 md. This equates to a regain permeability of fluid on the aloxite core of 82.4%.

EXAMPLE 2

HPSP Based Gel

Two hydroxyl propyl starch phosphate (HPSP) based gels with differing MFC content were made having the formulations as shown in Table 3.

TABLE 3

Formulation of HPSP Fluid

| Mixing order | Additive | Function | Chemical detail | Concentration |
|---|---|---|---|---|
| 1 | 9.2 ppg NaBr brine | Brine | Sodium bromide | Base fluid |
| 2 | Aldacide G | Biocide | Glutaraldehyde | 0.12 gal/1,000 gal |
| 3 | HPSP | Gelling agent | HPS | 40 g/Liter |
| 4 | FDP-S714-04 | Iron control | Sodium citrate | 12 lb/1,000 gal |
| 5 | FDP-S1081-13 | Gel stabilizer | Sodium Erythorbate | 40 lb/1,000 gal |
| 6 | MFC Material | Stability modifier | Cellulose | 0/50 lb/1,000 gal |

Figure 7:
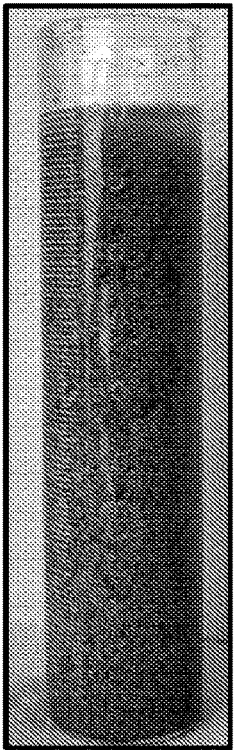
FIG. 7 is a set of photographs showing sand settling results from tests of compositions with and without micro fibrous cellulose content.
Figure 7:
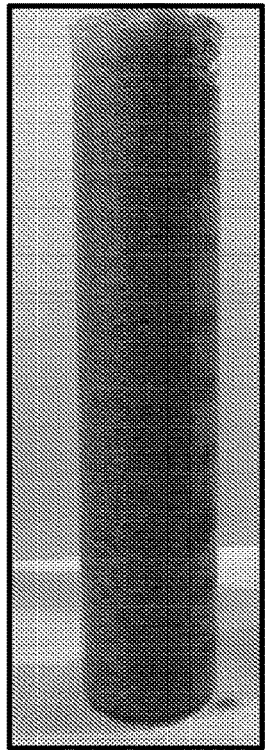
Figure 7:
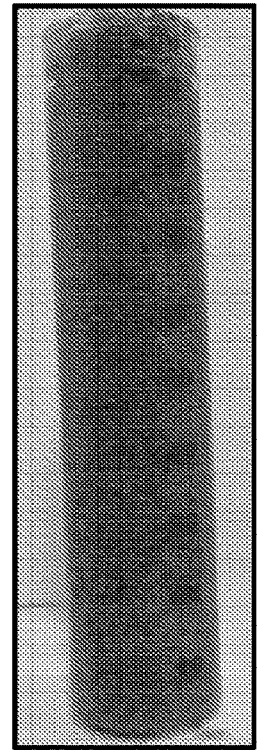

Proppant settling tests were conducted. Results from these tests are shown in FIG. 7. A HPSP gel sample without MFC was heated to 305° F. At 305° F. the gel lost its elastic nature and sand began to settle out. The gel had 3-4% sand settling in 1 hour.

A gel sample of HPSP gel with 50 lb/1,000 gal of MFC particles was heated to 330° F. The gel retained its elastic nature and no sand settling was observed in 1 hour. Another gel sample of HPSP gel with 50 lb/1,000 gal of MFC particles was heated to 340° F. The HPSP gel retained its elastic nature and no sand settling was observed in 1 hour. These tests confirm that the addition of micro-fibrous cellulose improves the elastic nature of gravel packing fluid and enables greater sand suspension, especially at elevated temperatures.

Optional Additives

The gravel packing fluids may comprise a thermal stabilizer. The thermal stabilizers may comprise one or more non-sulfur antioxidants that increase the thermal stability of the polysaccharide gelling agent. The thermal stabilizers may include, for example, ascorbic acid, any salt of ascorbic acid (e.g., sodium ascorbate), erythorbic acid, any salt of erythorbic acid (e.g., sodium erythorbate), tocopherol, any derivative thereof, and any combination thereof. The thermal stabilizers may be included in the gravel packing fluids in an amount in a range of about 5 lb/1,000 gal to about 300 lb/1,000 gal, alternatively about 10 lb/1,000 gal to about 50 lb/1,000 gal, alternatively about 25 lb/1,000 gal to about 100 lb/1,000 gal, or about 150 lb/1,000 gal. 200 lb/1,000 gal, or 250 lb/1,000 gal. Without limitation by theory, the thermal stabilizers may function by removing oxygen radicals from the gravel packing fluids. Oxygen radicals may break the ether linkages of the polysaccharide gelling agents. At higher temperatures, the prevalence of oxygen radicals may be increased, leading to acceleration in the breakdown of the polysaccharide gelling agents. In contrast to antioxidants that contain sulfur and may be subject to environmental regulations, the non-sulfur antioxidants may not damage the environment and thus, their use may be allowed in locations that are subject to strict environmental regulations, such as the North Sea, Gulf of Mexico, etc. With the benefit of this disclosure one of ordinary skill in the art should be able to determine a type and amount of thermal stabilizer for use in a desired application.

In optional examples, a gel breaker may be added to the gravel packing fluids when it is desirable to break the gravel packing fluids. In some example, the gel breaker may be added to the gravel packing fluids within a separate fluid. A wide variety of suitable gel breakers are well known to one having ordinary skill in the art. Examples of which include, but are not limited to oxidizers such as sodium bromate, sodium chlorate, or manganese dioxide. In other examples, the breaker can comprise a treatment fluid having a pH of about 7 or greater, which may cause the gelled gravel packing fluids to break. In some examples, the gel breaker may be present in the gravel packing fluid as a delayed-release gel breaker. For example, a gel breaker may be prepared for delayed release by encapsulating the gel breaker in a material that is slowly soluble or slowly degradable in the gravel packing fluid or the gel formed therefrom. The gel breaker may be included in the gravel packing fluids in an amount ranging from about 0.001% to about 0.5% by volume of the gravel packing fluids, alternatively about 0.01% to about 0.3% by volume of the gravel packing, or further alternatively, about 0.1% to about 0.2% by volume of the gravel packing. With the benefit of this disclosure, one of ordinary skill in the art should be able to determine a type and amount of gel breaker for use in a desired application.

In optional examples, the gravel packing fluids may comprise a non-emulsifier, or any such additive used to control emulsion formation in the gravel packing fluids. Examples of non-emulsifiers may include, but are not limited to ionic and nonionic surfactants, foaming agents, and the like. Commercial examples of non-emulsifiers include NEA-96M™ surfactant, PEN-5M™ foaming agent, and LoSurf-300M™ surfactant, all available from Halliburton Energy Services, Inc. of Houston, Tex. The non-emulsifiers may be included in the gravel packing fluids in an amount in a range of about 0.1% v/v to about 10% v/v. For example, the non-emulsifiers may be included in the gravel packing fluids in an amount in a range of about 1% v/v to about 9% v/v, alternatively about 2% v/v to about 8% v/v, or further alternatively, about 3% v/v, about 4% v/v, about 5% v/v, about 6% v/v, or about 7% v/v. With the benefit of this disclosure, one of ordinary skill in the art should be able to determine a type and amount of non-emulsifier for use in a desired application.

In optional examples, the gravel packing fluids may comprise an iron control agent, or any such additive used to reduce the precipitation of iron. Examples of iron control agents may include reducing agents and chelates; specific examples may include but are not limited to citric acid, sodium citrate, potassium citrate, acetic anhydride. The iron control agents may be included in the gravel packing fluids in an amount in a range of about 0.01% w/v to about 1% w/v. For example, the iron control agents may be included in the gravel packing fluids in an amount in a range of about 0.1% w/v to about 0.9% w/v, alternatively about 0.2% w/v to about 0.8% w/v, or further alternatively, about 0.3% w/v, about 0.4% w/v, about 0.5% w/v, about 0.6% w/v, or about 0.7% w/v. With the benefit of this disclosure, one of ordinary skill in the art should be able to determine a type and amount of iron control agent for use in a desired application.

The treatment fluids disclosed herein may be free of or essentially free of crosslinkers. Examples of crosslinkers may include, but are not limited to metal ions such as titanium (IV) ions, zirconium (IV) ions, chromium (III) ions, cobalt (III) ions, aluminum (III) ions, hafnium (III) ions, and the like; as well as metal ion-releasing compounds such as coordination compounds; organic crosslinkers such as diamines, dithiols, or diols; organic polymers such as polyesters, polyalkyleneimines (e.g., polyethyleneimine), or polyalkylenepolyamines. In some examples, the gravel packing fluids may encounter crosslinkers within a subterranean formation, said crosslinkers being present in the subterranean formation previously as either a native component of the subterranean formation or being introduced by a prior pumped fluid. In these examples, the gravel packing fluids may be free or substantially free of "added" crosslinkers, wherein "added" is defined as the addition of crosslinkers to the gravel packing fluids during preparation of the gravel packing fluids and prior to introduction of the gravel packing fluids in the subterranean formation.

The treatment fluids disclosed herein may contain pH control additives. The pH control additives in certain embodiments, may comprise bases, chelating agents, acids, or combinations of chelating agents and acids or bases. A pH control additive may be necessary to maintain the pH of the treatment fluid at a desired level, e.g., to improve the dispersion of the gelling agent in the aqueous base fluid. In some instances, it may be beneficial to maintain the pH at neutral or above 7.

In some embodiments, the treatment fluids of the present disclosure may include surfactants, e.g., to improve the compatibility of the viscosified treatment fluids of the present invention with other fluids (like any formation fluids) that may be present in the well bore. An artisan of ordinary skill with the benefit of this disclosure will be able to identify the type of surfactant as well as the appropriate concentration of surfactant to be used. Suitable surfactants may be used in a liquid or powder form. Where used, the surfactants are present in the viscosified treatment fluid in an amount sufficient to prevent incompatibility with formation fluids or well bore fluids. In an embodiment where liquid surfactants are used, the surfactants are generally present in an amount in the range of from about 0.01% to about 5.0% by volume of the viscosified treatment fluid. In one embodiment, the liquid surfactants are present in an amount in the range of from about 0.1% to about 2.0% by volume of the viscosified treatment fluid. In embodiments where powdered surfactants are used, the surfactants may be present in an amount in the range of from about 0.001% to about 0.5% by weight of the viscosified treatment fluid. Examples of suitable surfactants are non-emulsifiers commercially available from Halliburton Energy Services, Inc., under the tradenames LOSURF-259, LOSURF-300, LOSURF-357, LOSURF-400 and NEA-96M.

In some embodiments, the viscosified treatment fluids of the present disclosure may contain bactericides to protect both the subterranean formation as well as the viscosified treatment fluid from attack by bacteria. Such attacks may be problematic because they may lower the viscosity of the viscosified treatment fluid, resulting in poorer performance, such as poorer sand suspension properties, for example. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include a 2,2-dibromo-3-nitrilopropionamide, commercially available under the tradename BE-3S Surfactant and 2-bromo-2-nitro-1,3-propanediol commercially available under the tradename BE-6 from Halliburton Energy Services, Inc.

If desired, stabilizers may be added to the viscosified treatment fluids of the present disclosure, e.g., in high-temperature fracturing, gravel packing or frac packing operations. Suitable stabilizers include sodium thiosulfate. Such stabilizers may be useful when the viscosified treatment fluids of the present invention are utilized in a subterranean formation having a temperature above about 200° F.

Other additives suitable for use in operations in subterranean formations also may be optionally added to the gel composition. These other additives can include, but are not limited to, scale inhibitor, corrosion inhibitor, paraffin inhibitor, asphaltene inhibitor, and other commonly used oilfield chemicals and combinations thereof. A person having ordinary skill in the art, with the benefit of this disclosure, can determine the type and amount of additive useful for a particular application and desired result.

Further, the present treatment fluids can optionally comprise any number of additional additives commonly used in treatment fluids including, for example, foaming agents, defoaming agents, antifoam agents, emulsifying agents, de-emulsifying agents, salts, acids, fluid loss control additives, gas, catalysts, dispersants, flocculants, scavengers (e.g., $H_2S$ scavengers, $CO_2$ scavengers or $O_2$ scavengers), lubricants, breakers, friction reducers, bridging agents, weighting agents, solubilizers, hydrate inhibitors, consolidating agents, biocides and the like. Combinations of these additives can be used as well.

In some embodiments, the methods can further comprise performing a treatment operation in the portion of the subterranean formation such as, for example, a fracturing operation, a gravel packing operation, a frac pack operation, or combinations thereof. In some embodiments, the methods can further comprise forming a proppant pack or a gravel pack in the portion of the subterranean formation being treated.

An embodiment of the present disclosure is a method of placing a gravel pack in a subterranean formation that includes providing a gravel packing fluid in the form of a linear gel and comprising an aqueous base fluid, a thickening agent soluble in the aqueous fluid, gravel, and micro fibrous cellulose. The gravel packing fluid is placed into the subterranean formation and a gravel pack is created in the subterranean formation. The gravel pack can be located within an annulus between a gravel pack screen and the subterranean formation. In an embodiment a portion of the gravel pack is located within the subterranean formation. The aqueous base fluid can be a brine. The thickening agent can be a polysaccharide gelling agent selected from the group consisting of xanthan, scleroglucan, diutan, succinoglycan, guar, hydroxyethyl cellulose, and combinations thereof. The thickening agent can be a hydroxypropyl starch phosphate. In an embodiment the micro fibrous cellulose is present in the gravel packing fluid in an amount of about 5 lb/1,000 gal to about 300 lb/1,000 gal. The thickening agent can be a linear polymer. In an embodiment the gravel packing fluid is placed into the subterranean formation using one or more pumps.

An embodiment of the present disclosure is a method of fracturing a subterranean formation that includes providing a fracturing fluid in the form of a linear gel having an aqueous base fluid, a thickening agent soluble in the aqueous fluid, sand, and micro fibrous cellulose. A fracture is created in the subterranean formation. Fracturing fluid is placed into the subterranean formation and sand is deposited within the fracture in the subterranean formation. The fracturing fluid can be a brine. The thickening agent can be a polysaccharide gelling agent selected from the group consisting of xanthan, scleroglucan, diutan, succinoglycan, guar, hydroxyethyl cellulose, and combinations thereof. The thickening agent can be a hydroxypropyl starch phosphate. In an embodiment the micro fibrous cellulose is present in the fracturing fluid in an amount of about 5 lb/1,000 gal to about 300 lb/1,000 gal. The thickening agent can be a linear polymer. In an embodiment the fracturing fluid is placed into the subterranean formation using one or more pumps.

An embodiment of the present disclosure is a treatment fluid composition for use in a subterranean formation that includes an aqueous base fluid, a thickening agent soluble in the aqueous base fluid, gravel, and micro fibrous cellulose. The thickening agent can be a polysaccharide gelling agent selected from the group consisting of xanthan, scleroglucan, diutan, succinoglycan, guar, hydroxyethyl cellulose, and combinations thereof. The thickening agent can be a hydroxypropyl starch phosphate. In an embodiment the micro fibrous cellulose is present in the fracturing fluid in an amount of about 5 lb/1,000 gal to about 300 lb/1,000 gal.

As defined herein, a "treatment fluid" is a fluid that is placed in a subterranean formation in order to achieve a desired purpose. Treatment fluids can be used in a variety of subterranean operations, including, but not limited to, stimulation operations, remedial operations, fracturing operations, and gravel packing operations. As used herein, the terms "treatment" and "treating" refer to any subterranean operation that uses a fluid in conjunction with performing a desired function and/or achieving a desired purpose. The terms "treatment" and "treating," as used herein, do not imply any particular action by the fluid or any particular component thereof unless otherwise specified. Treatment fluids can include, without limitation, fracturing fluids, acidizing fluids, conformance treatments, damage control fluids, remediation fluids, scale removal and inhibition fluids, and the like.

The treatment solutions and methods of the present disclosure are applicable in both newly drilled formations and in formations requiring re-stimulation. The solutions and methods of the present disclosure are particularly useful for formation re-stimulations where hydrocarbons will be present in the formation zones.

The various embodiments of the present disclosure can be joined in combination with other embodiments of the disclosure and the listed embodiments herein are not meant to limit the disclosure. All combinations of various embodiments of the disclosure are enabled, even if not given in a particular example herein.

While illustrative embodiments have been depicted and described, modifications thereof can be made by one skilled in the art without departing from the scope of the disclosure. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted. While compositions and methods are described in terms of "comprising," "containing," or "including" various components or steps, the compositions and methods can also "consist essentially of" or "consist of" the various components and steps. Also, the terms in the claims have their plain, ordinary meaning unless otherwise explicitly and clearly defined by the patentee.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples.

Numerous other modifications, equivalents, and alternatives, will become apparent to those skilled in the art once the above disclosure is fully appreciated. While embodiments of the disclosure have been shown and described, modifications thereof can be made by one skilled in the art without departing from the teachings of this disclosure. The embodiments described herein are exemplary only, and are not intended to be limiting. Many variations and modifications of the disclosure disclosed herein are possible and are within the scope of the disclosure.

Use of the term "optionally" with respect to any element of a claim is intended to mean that the subject element is required, or alternatively, is not required. Both alternatives are intended to be within the scope of the claim. It is intended that the following claims be interpreted to embrace all such modifications, equivalents, and alternatives where applicable. Other and further embodiments, versions and examples of the disclosure may be devised without departing from the basic scope thereof and the scope thereof is determined by the claims that follow.

What is claimed is:

1. A method of placing a gravel pack in a subterranean formation comprising:
   providing a gravel packing fluid in the form of a linear gel and comprising an aqueous base fluid, hydroxypropyl starch phosphate, gravel, and micro fibrous cellulose; and
   placing the gravel packing fluid into the subterranean formation; and creating a gravel pack in the subterranean formation.

2. A method of placing a gravel pack in a subterranean formation comprising:
   providing a gravel packing fluid in the form of a linear gel and comprising an aqueous base fluid, hydroxypropyl starch phosphate soluble in the aqueous fluid, gravel, and micro fibrous cellulose wherein the micro fibrous cellulose is present in the gravel packing fluid in an amount of about 5 lb/1,000 gal to about 300 lb/1,000 gal creating a three dimensional network surrounding the hydroxypropyl starch phosphate to increase elasticity of the gravel packing fluid; and
   placing the gravel packing fluid into the subterranean formation; and
   creating a gravel pack in the subterranean formation.

3. The method of claim 2, wherein the micro fibrous cellulose forms a network structure of elongated amorphous and crystalline regions surrounding the thickening agent to form a suspension.

4. The method of claim 2, wherein a bottom hole static temperature of the subterranean formation of about 275° F. to about 350° F.

5. The method of claim 2, wherein the gravel pack is located within an annulus outside a gravel pack screen.

6. The method of claim 2, wherein a portion of the gravel pack is located within the subterranean formation.

7. The method of claim 2, wherein the aqueous base fluid comprises a brine.

8. The method of claim 7, wherein the brine is selected from the group consisting a monovalent brine, a divalent brine, and combinations thereof.

9. The method of claim 8, wherein the monovalent brine comprises sodium chloride brines, sodium bromide brines, potassium chloride brines, potassium bromide brines, or combinations thereof.

10. The method of claim 8, wherein the divalent brine comprises magnesium chloride brines, calcium chloride brines, calcium bromide brines, or combinations thereof.

11. The method of claim 2, wherein the gravel packing fluid is placed into the subterranean formation using one or more pumps.

12. The method of claim 2, wherein the gravel is present in a size of about 0.0083 inches to about 0.0661 inches.

13. A method of placing a gravel pack in a subterranean formation comprising:
   providing a gravel packing fluid in the form of a linear gel, wherein the gravel packing fluid comprises a brine, hydroxypropyl starch phosphate soluble in the brine, gravel, and micro fibrous cellulose wherein the micro fibrous cellulose is present in the gravel packing fluid in an amount of about 5 lb/1,000 gal to about 300 lb/1,000 gal creating a three dimensional network surrounding the hydroxypropyl starch phosphate to increase elasticity of the gravel packing fluid in temperatures of about 270° F. to about 350° F.; and
   placing the gravel packing fluid into the subterranean formation such that a gravel pack is formed in the subterranean formation.

14. The method of claim 13, wherein the gravel pack is located within an annulus outside a gravel pack screen.

15. The method of claim 13, wherein the brine comprises sodium bromide.

16. The method of claim 13, wherein the gravel is present in a size of about 0.0083 inches to about 0.0661 inches.

* * * * *